(12) United States Patent
Zeng et al.

(10) Patent No.: US 12,726,679 B2
(45) Date of Patent: Sep. 1, 2026

(54) METHOD, APPARATUS, DEVICE AND MEDIUM FOR LIVE STREAMING INTERACTION

(71) Applicant: Beijing Zitiao Network Technology Co., Ltd., Beijing (CN)

(72) Inventors: Ping Zeng, Beijing (CN); Bibo He, Beijing (CN); Meng He, Beijing (CN); Jianhua Xu, Beijing (CN); Tongkai Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/222,495

(22) Filed: May 29, 2025

(65) Prior Publication Data

US 2025/0380030 A1 Dec. 11, 2025

(30) Foreign Application Priority Data

Jun. 6, 2024 (CN) ......................... 202410732985.0

(51) Int. Cl.

| | |
|---|---|
| ***H04N 21/472*** | (2011.01) |
| ***H04N 21/2187*** | (2011.01) |
| ***H04N 21/2343*** | (2011.01) |
| ***H04N 21/4788*** | (2011.01) |

(52) U.S. Cl.
CPC ... *H04N 21/47205* (2013.01); *H04N 21/2187* (2013.01); *H04N 21/234345* (2013.01); *H04N 21/4788* (2013.01)

(58) Field of Classification Search
CPC ....... H04N 21/477205; H04N 21/2187; H04N 21/234345; H04N 21/4788
See application file for complete search history.

(56) References Cited

U.S. PATENT DOCUMENTS

2024/0080505 A1* 3/2024 Hsu .................... H04N 21/4788
2025/0159030 A1* 5/2025 Chuang ................ H04N 21/472

* cited by examiner

*Primary Examiner* — Nicholas T Corbo
(74) *Attorney, Agent, or Firm* — Alleman Hall LLP

(57) ABSTRACT

Embodiments of the present disclosure involve a method, an apparatus, a device, and a medium for live streaming interaction. The method comprises: displaying a first virtual resource comprising a mergeable identifier on a live streaming interface, wherein the first virtual resource is sent from a first user to a streamer user; displaying, in response to a triggering operation of a second user for the first virtual resource, at least one resource to be merged corresponding to the first virtual resource; acquiring, in response to a selection operation of the second user for a second virtual resource of the at least one resource to be merged, a merged resource of the first virtual resource and the second virtual resource; sending the merged resource to the streamer user, and displaying the merged resource and a merged identifier on the live streaming interface.

17 Claims, 8 Drawing Sheets

METHOD, APPARATUS, DEVICE AND MEDIUM FOR LIVE STREAMING INTERACTION

CROSS-REFERENCE TO RELATED APPLICATION(S)

This application claims priority to Chinese Application No. 202410732985.0 filed in Jun. 6, 2024, the disclosures of which are incorporated herein by reference in their entireties.

FIELD

The present disclosure relates to the field of live streaming technology, and particularly to a method, an apparatus, a device, and a medium for live streaming interaction.

BACKGROUND

With the continuous development of live streaming technology, users can interact with the streamer while watching the live streaming. Generally, during the live streaming, users can send a virtual resource as a gift to the streamer, and the gift can be displayed on a live streaming interface.

SUMMARY

The present disclosure provides a method, an apparatus, a device, and a medium for live streaming interaction.

Embodiments of the present disclosure provide a method for live streaming interaction. The method comprises:

displaying a first virtual resource comprising a mergeable identifier on a live streaming interface, wherein the first virtual resource is sent from a first user to a streamer user;

displaying, in response to a triggering operation of a second user for the first virtual resource, at least one resource to be merged corresponding to the first virtual resource;

acquiring, in response to a selection operation of the second user for a second virtual resource of the at least one resource to be merged, a merged resource of the first virtual resource and the second virtual resource.

sending the merged resource to the streamer user, and displaying the merged resource and a merged identifier on the live streaming interface.

Embodiments of the present disclosure further provide an apparatus for live streaming interaction. The apparatus comprises:

a displaying module for displaying a first virtual resource comprising a mergable identifier on a live streaming interface, wherein the first virtual resource is sent from a first user to a streamer user;

a triggering module for, displaying, in response to a triggering operation of a second user for the first virtual resource, at least one resource to be merged corresponding to the first virtual resource;

a merging module for, acquiring, in response to a selection operation of the second user for a second virtual resource of the at least one resource to be merged, a merged resource of the first virtual resource and the second virtual resource;

a sending module for, sending the merged resource to the streamer user, and displaying the merged resource and a merged identifier on the live streaming interface.

Embodiments of the present disclosure further provide an electronic device comprising: a processor; a memory for storing processor executable instructions; the processor for reading the executable instructions from the memory and executing the instructions to implement the method for live streaming interaction.

Embodiments of the present disclosure further provide a computer-readable storage medium storing a computer program thereon for executing the method for live streaming interaction.

BRIEF DESCRIPTION OF THE DRAWINGS

Through the following detailed description with reference to the accompanying drawings, the above and other objectives, features, and advantages of example embodiments of the present disclosure will become more apparent. Throughout the drawings, the same reference numerals usually refer to the same components. It should be understood that the drawings are diagrammatic and that elements and factors are not necessarily drawn to scale.

DETAILED DESCRIPTION OF EMBODIMENTS

Figure 1:
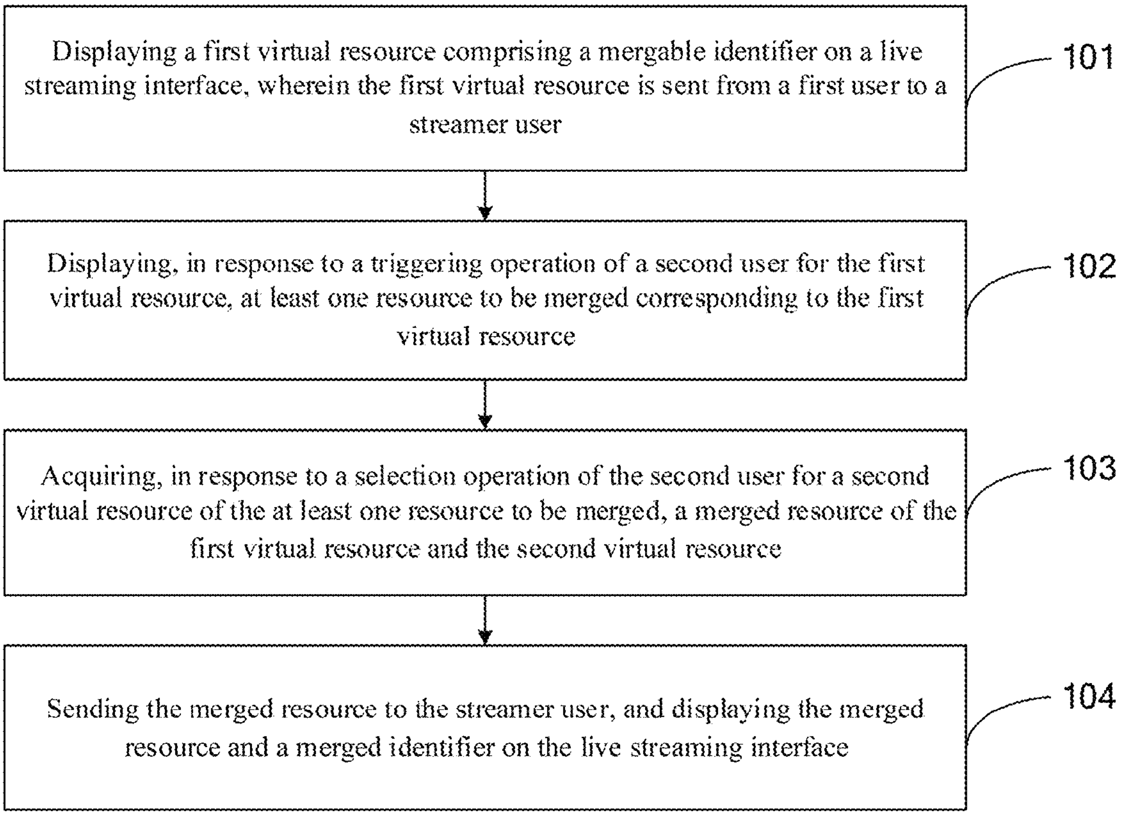
FIG. 1 illustrates a schematic flow diagram of a method for live streaming interaction in accordance with an embodiment of the present disclosure.

Embodiments of the present disclosure will be described in more details below with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art. It should be understood that the drawings and examples of the present disclosure are for illustrative purposes only and are not intended to limit the scope of the present disclosure.

It should be understood that the various steps recited in the method embodiments of the present disclosure may be performed in a different order and/or in parallel. Moreover, method embodiments may include additional steps and/or omit performing the steps shown. The scope of the present disclosure is not limited in this respect.

As used herein, the term "comprise" and its variants are to be read as open-ended terms that mean "comprises, but is not limited to." The term "based on" is to be read as "based at least in part on." The term "one example embodiment" is to be read as "at least one example embodiment." The term "a further embodiment" is to be read as "at least a further embodiment." The terms "some embodiments" is to be read as "at least some embodiments." Relevant definitions of other terms will be given in the following description.

It should be noted that references to "first", "second", and the like in this disclosure are only used to distinguish between different apparatuses, modules, or units and are not intended to limit the order or interdependence of the functions performed by the apparatuses, modules, or units.

It is noted that the modifications referred to "a" and "more" throughout this disclosure are intended to be illustrative and not restrictive, and those skilled in the art will understand that "one or more" is to be interpreted unless the context clearly indicates otherwise.

The names of messages or information interacted between apparatuses in embodiments of the present disclosure are for illustrative purposes only and are not intended to limit the scope of such messages or information.

In the related art, when different users send virtual resources, only simple interaction, such as displaying the number of the same virtual resource, can be realized. As a result, the live streaming interaction is weak, and lack richness and interest, which cannot satisfy the user's interaction requirements for sending gifts in live streaming.

In order to solve the above technical problem, the present disclosure provides a method, an apparatus, a device, and a medium for live streaming interaction.

In order to solve the weak interaction problem of virtual resource gifting in a live scene in the related art, the embodiments of the present disclosure provide a method for live streaming interaction, and the method is described below in conjunction with specific embodiments.

FIG. 1 illustrates a schematic flow diagram of a method for live streaming interaction in accordance with an embodiment of the present disclosure. The method may be performed by an apparatus for live streaming interaction, and the apparatus may be implemented in software and/or hardware, and may generally be integrated in an electronic device. As shown in FIG. 1, the method comprises:

Step 101: displaying a first virtual resource comprising a mergable identifier on a live streaming interface, wherein the first virtual resource is sent from a first user to a streamer user.

The method for live streaming interaction in the embodiments of the present disclosure is applied to a second client where a second user is located, and the first user and the second user may be different audience users watching the live streaming, and the streamer user may be an initiating user who is live streaming. The live streaming interface may be a page used for displaying a live streaming channel of the streamer user, and the live streaming interface may be displayed via a web page or an application page, and the first user and the second user may respectively watch the live streaming on the live streaming interface via a corresponding client.

The virtual resource of embodiments of the present disclosure can be a resource which can be transferred from one user to another user on a live streaming channel, and the virtual resource may comprise a virtual flower, a virtual heart, etc. and can be given to the streamer user by the audience user on the live streaming interface. The first virtual resource may be a virtual resource that the first user sends to the streamer user while watching the streamer user's live streaming on the live streaming interface. The "mergerable" identifier may be an identifier indicating that a virtual resource can be merged with another virtual resource to generate a new virtual resource, and can be characterized by numbers, letters, preset figures, etc. without limitation.

Specifically, the second client may acquire the first virtual resource sent by the first user to the streamer user, and display the first virtual resource and a corresponding "mergerable" identifier on the live streaming interface, and the display position of the "mergerable" identifier is not limited, for example, may be the upper right corner of the first virtual resource, and the second user may learn that the first virtual resource is a mergerable resource.

In some embodiments, prior to step 101 above, the method for live streaming interaction may further comprise: acquiring the first virtual resource, and determining whether the first virtual resource supports merging; wherein displaying the first virtual resource comprising a mergable identifier on a live streaming interface comprises: if it is determined that the first virtual resource supports merging, a first virtual resource comprising a mergable identifier is displayed on a live streaming interface. Alternatively, determining that the first virtual resource supporting merging comprises: if a merging operation field corresponding to the first virtual resource is a preset value, it is determined that the first virtual resource supports merging.

The merging operation field is a field set for a virtual resource to characterize whether the virtual resource can be merged with other virtual resource to generate a new virtual resource. The merging operation field can be of a preset value or a non-preset value, for example, the merging operation field can be expressed as a bool is_can_merge, and when the merging operation field is a preset value, that is, the bool is_can_merge=true, meaning that the virtual resource supports merging, and when the merging operation field is a non-preset value, that is, the bool is_can_merge=false, meaning that the virtual resource does not support merging.

Alternatively, the merging operation field corresponding to the first virtual resource is set to a preset value after the first user performs a triggering operation on the resource merging control. The resource merging control can be a functional control provided to a user so that the user can select whether a virtual resource supports merging, and after the resource merging control is triggered by the user, the virtual resource support merging can be set to support merging, and specifically can be set by setting a merging operation field of the virtual resource as a preset value.

Specifically, the first client can display the resource merging control in response to a sending operation of the first user on the first virtual resource, and set the merging operation field of the first virtual resource as the preset value in response to the triggering operation of the first user on the resource merging control, and sends the first virtual resource to the streamer user, and sends the merging operation field of the first virtual resource to the service end, and the service end forwards the first virtual resource and the merging operation field to the second client of the second user. A second client acquires a first virtual resource, and judges whether the first virtual resource supports merging, and specifically can judge whether a merging operation field of the first virtual resource is a preset value, and if so, it is determined that the first virtual resource supports merging, and a merging identifier is displayed while the first virtual resource is displayed on the live streaming interface; otherwise, it is determined that the first virtual resource does not support merging, and only the first virtual resource is displayed on the live streaming interface.

Step 102: displaying, in response to a triggering operation of a second user for the first virtual resource, at least one resource to be merged corresponding to the first virtual resource.

The second user may be a different viewer user watching the live streaming from the first user, the number of the second users may be one or more. A resource to be merged of the first virtual resource can be merged with the first virtual resource to acquire a new virtual resource, and the number of the resources to be merged can be one or more, without limitation.

Specifically, after receiving the triggering operation of a second user for the first virtual resource comprising a "mergerable" identifier, a second client can acquire at least one resource to be merged corresponding to the first virtual resource, and the specific acquisition method can be matched in a preset resource library to acquire a resource to be merged successfully matched, and the preset resource library can set at least one resource to be merged respectively corresponding to a plurality of virtual resources; and display the at least one resource to be merged on a live streaming interface.

Figure 2:
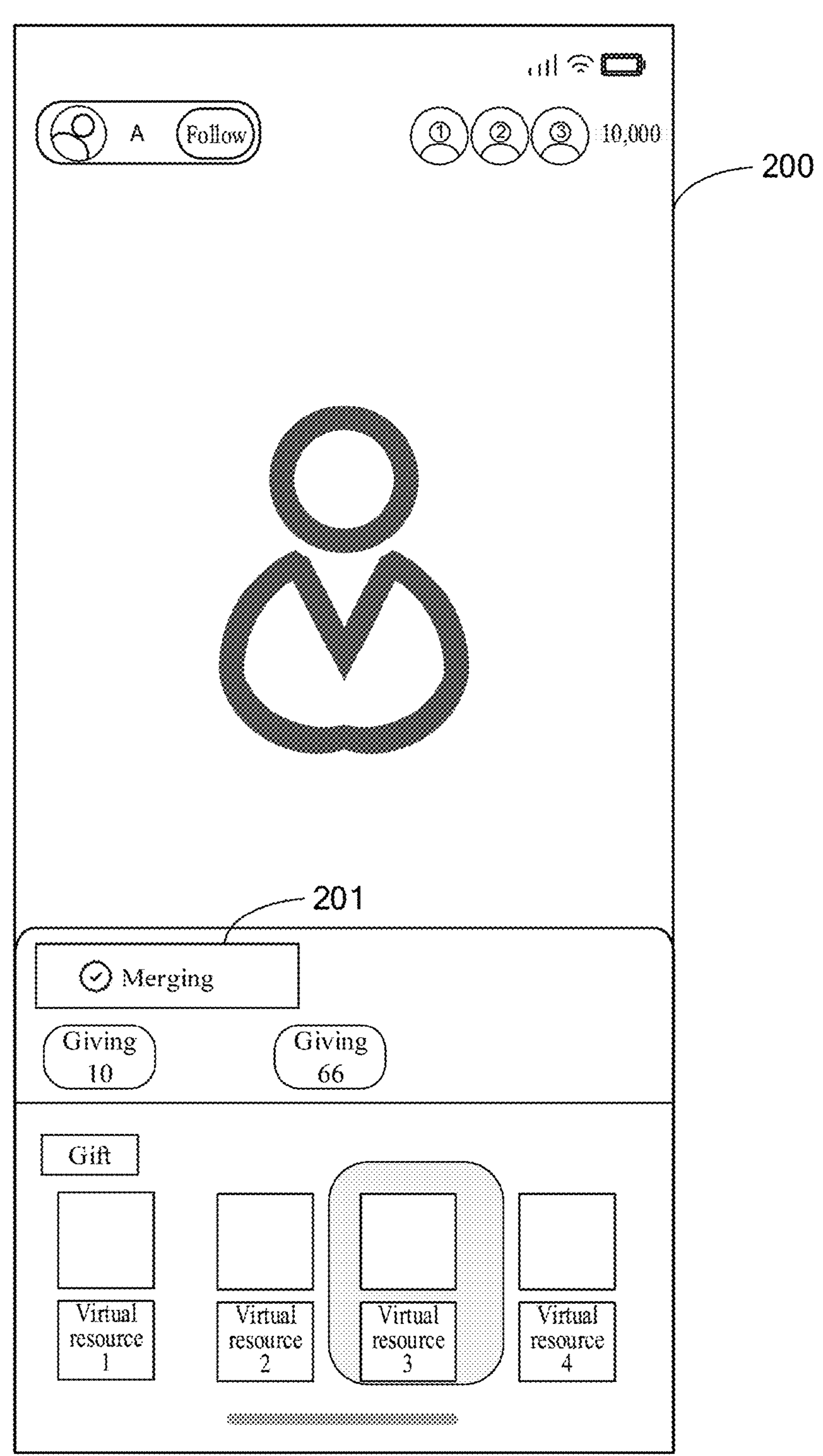
FIG. 2 illustrates a schematic diagram of a method for live streaming interaction in accordance with an embodiment of the present disclosure.

Illustratively, FIG. 2 illustrates a schematic diagram of a method for live streaming interaction in accordance with an embodiment of the present disclosure. A live streaming interface 200 of a first client is shown in FIG. 2. The live streaming interface 200 comprises a resource merging control 201 and four virtual resources, wherein a virtual resource 3 can be taken as a first virtual resource triggered by a first user, and the resource merging control 201 is shown after the first user performs a sending operation on the first virtual resource, and when the first user performs a triggering operation on the resource merging control 201, a selection identifier is shown in the resource merging control 20, meaning that the first user sets that the first virtual resource can be merged.

Figure 3:
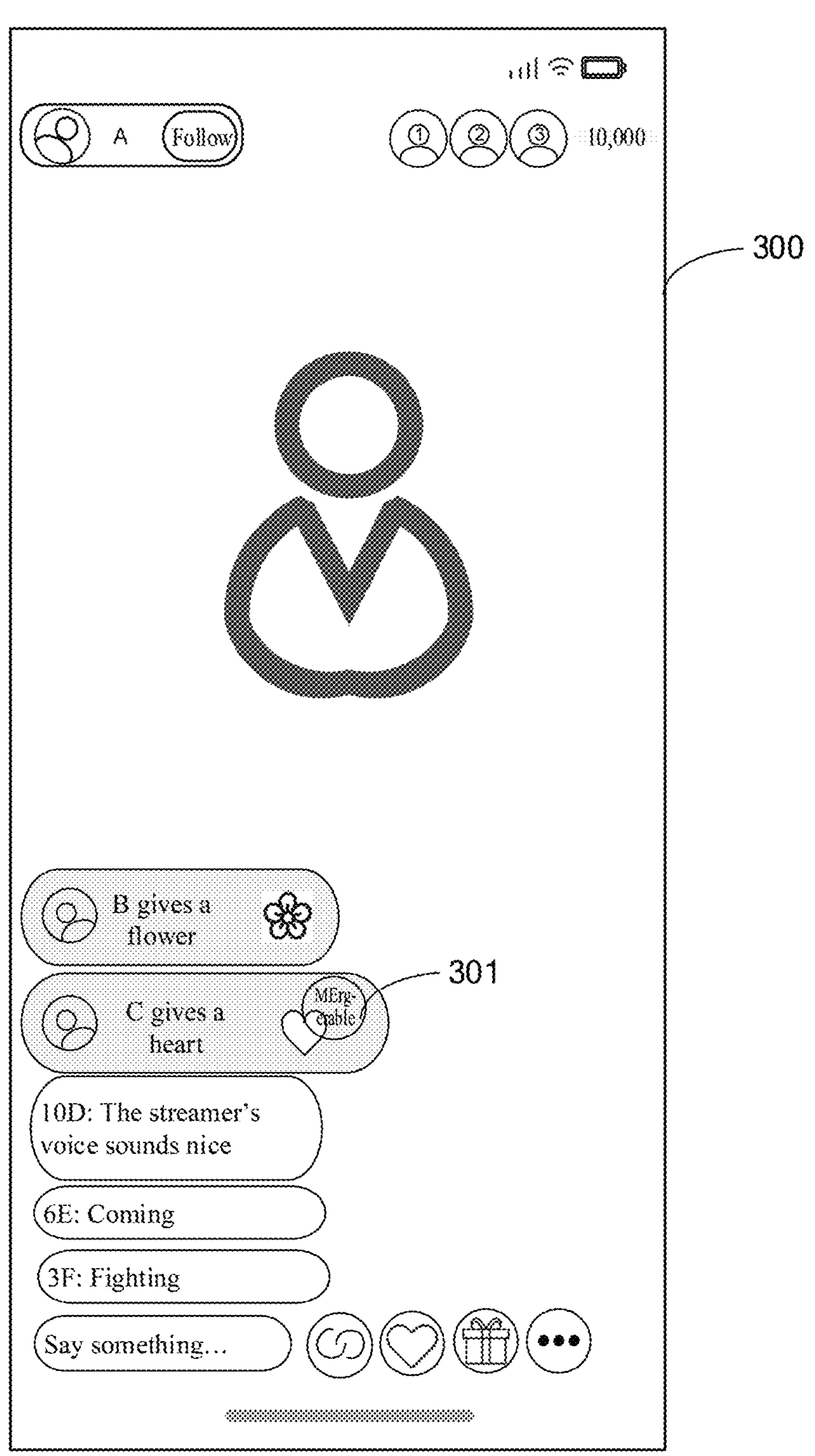
FIG. 3 illustrates a schematic diagram of another live streaming interface in accordance with an embodiment of the present disclosure.

Illustratively, FIG. 3 is a schematic diagram of another live streaming interface provided by an embodiment of the present disclosure. A live streaming interface 300 of a second client is shown in FIG. 3. The live streaming interface 300 comprises a first virtual resource 301 sent by a first user to a streamer user, and the upper right corner of the first virtual resource 301 comprises a "mergerable" identifier, and the expression manner and the position of the "mergerable" identifier in the figures are merely examples. When the second user performs a triggering operation on the first virtual resource 301, two resources to be merged of FIG. 4 can be illustrated.

Figure 4:
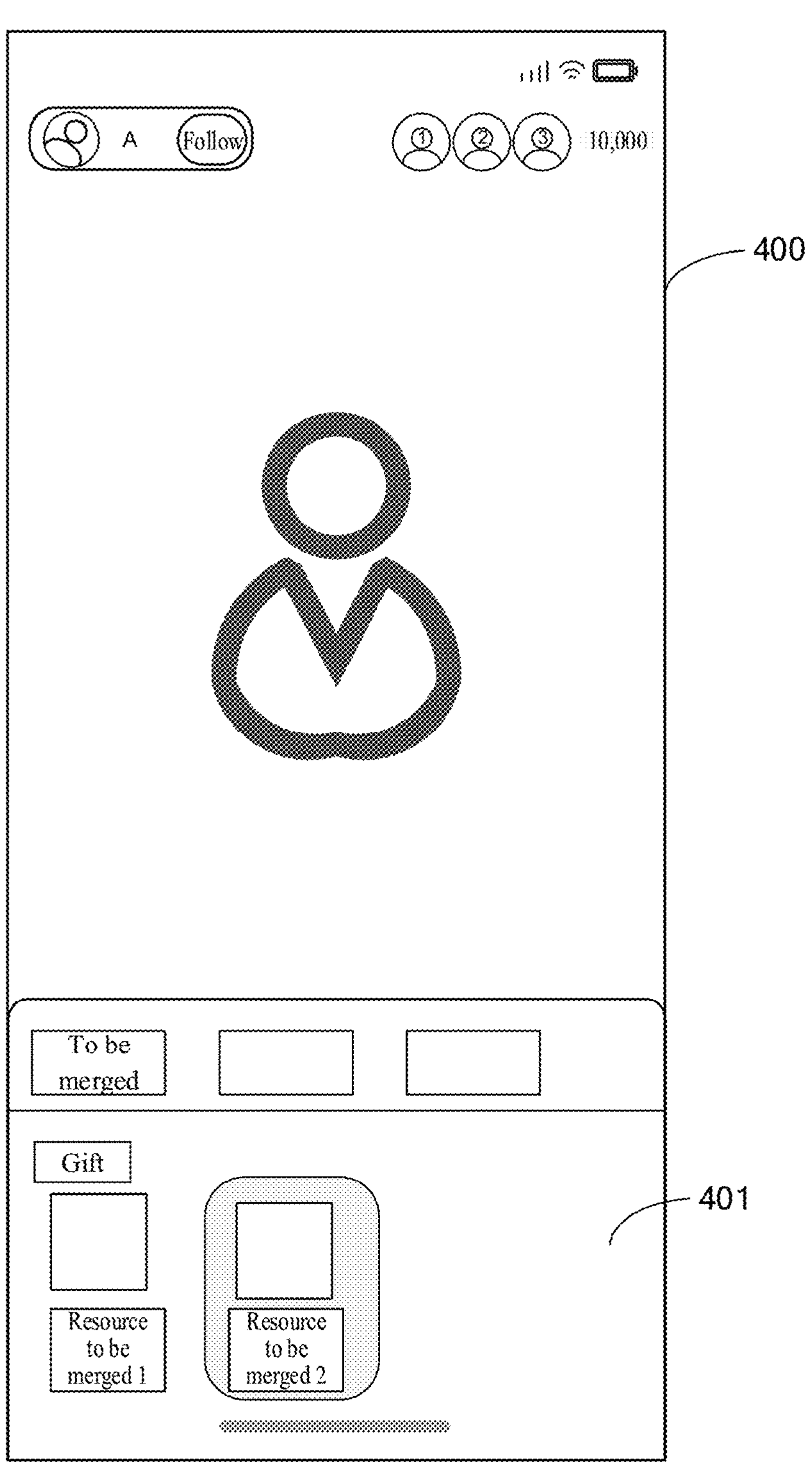
FIG. 4 illustrates a schematic diagram of yet another live streaming interface in accordance with an embodiment of the present disclosure.

Illustratively, FIG. 4 illustrates a schematic diagram of yet another live streaming interface in accordance with an embodiment of the present disclosure. A live streaming interface 400 of a second client is shown in FIG. 4. The live streaming interface 400 comprises a region 401 corresponding to types of objects to be merged, and two resources to be merged corresponding to the first virtual resource 301 are shown in the region 401.

Step 103, acquiring, in response to a selection operation of the second user for a second virtual resource of the at least one resource to be merged, a merged resource of the first virtual resource and the second virtual resource.

The second virtual resource can be a resource to be merged selected by the second user among at least one resource to be merged, and since the number of the second users is one or more and a number of the second virtual resources is one or more, one second user can select one second virtual resource. A merged resource may be a new virtual resource acquired from merged two or more virtual resources and the merged resource is completely different from the previous virtual resource of the union.

Specifically, the second client may receive an operation of the second user to at least one resource to be merged, and determine the resource to be merged as the second virtual resource after receiving a selection operation on one of the resources to be merged, and acquire a merged resource of the above-mentioned first virtual resource, for example, the first virtual resource is a virtual flower, and the second virtual resource is a virtual heart, and the merged resource may be a virtual pentagon, which are merely examples.

Illustratively, referring to FIG. 4, the second user performs a triggering operation on a resource to be merged 2 in the two resources to be merged, then the resource to be merged 2 is the second virtual resource.

In some embodiments, acquiring a merged resource of the first virtual resource and the second virtual resource comprises: superimposing the first virtual resource and the second virtual resource to acquire a corresponding merged resource; or, extracting, based on matching the first virtual resource and the second virtual resource in a preset resource library, a target virtual resource successfully matched as the merged resource.

The preset resource library may comprise a merged resource corresponding to a plurality of virtual resources, and the number of the plurality of virtual resources supporting merging may be set according to actual requirements, for example, it may be set to support only two virtual resources to be merged. Specifically, when acquiring the merged resource of the first virtual resource and the second virtual resource, the second client may superimpose the first virtual resource and the second virtual resource, for example, superimposing icons of the first virtual resource and the second virtual resource to acquire the merged resource; or match in a preset resource library to acquire a target virtual resource successfully matched with the first virtual resource and the second virtual resource as the merged resource.

Step 104, sending the merged resource to the streamer user, and displaying the merged resource and a merged identifier on the live streaming interface.

The merged identifier can be an identifier characterizing a virtual resource acquired from merged two or more virtual resources, and a user, as browsing the merged identifier, can learn that the corresponding virtual resource is a new merged resource.

Specifically, the second client can send the merged resource to the streamer user, namely, the merged resource is bound to the streamer user, and complete the operation of giving a gift, and present the merged resource and the merged identifier on the live streaming interface, and send the merged resource and the merged identifier to the first client of the first user, the streamer client of the streamer user and the clients of other users watching the live streaming. In this way, the clients can display the merged resource and the merged identifier on the live streaming interface.

Figure 5:
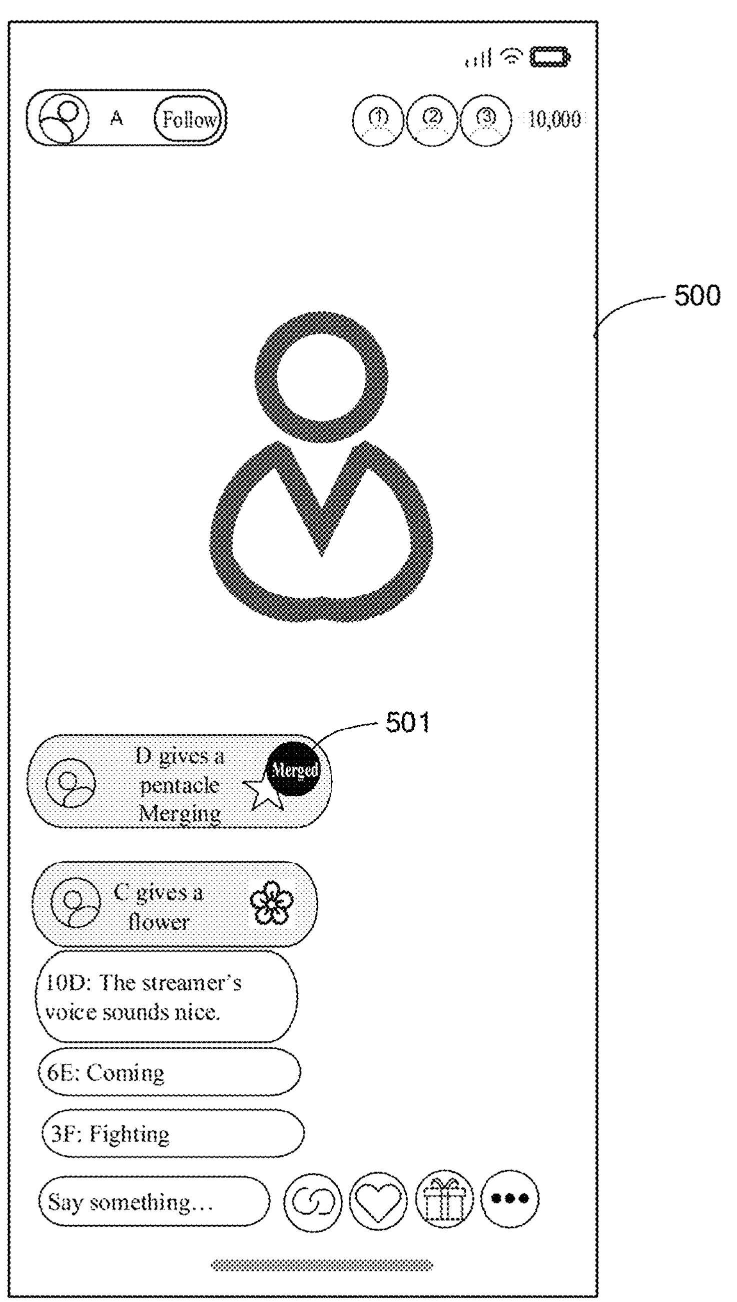
FIG. 5 illustrates a schematic diagram of still yet another live streaming interface in accordance with an embodiment of the present disclosure.

Illustratively, FIG. 5 illustrates a schematic diagram of still yet another live streaming interface in accordance with an embodiment of the present disclosure. A live streaming interface 500 of a second client is shown in FIG. 5. The live streaming interface 500 comprises a merged resource 501 of the first virtual resource in FIG. 2 and the second virtual resource in FIG. 4, and the upper right corner of the merged resource 501 comprises a "merged" identifier, and the expression manner and the position of the merged identifier are merely examples.

The live streaming interaction solution provided by embodiments of the present disclosure comprises: displaying a first virtual resource comprising a mergable identifier on a live streaming interface, wherein the first virtual resource is sent from a first user to a streamer user; displaying, in response to a triggering operation of a second user for the first virtual resource, at least one resource to be merged corresponding to the first virtual resource; acquiring, in response to a selection operation of the second user for a second virtual resource of the at least one resource to be merged, a merged resource of the first virtual resource and the second virtual resource; sending the merged resource to the streamer user, and displaying the merged resource and a merged identifier on the live streaming interface. With the above-mentioned subject matter, with regard to a first virtual resource comprising a mergable identifier sent by one user displayed on a live streaming interface, another user can select a second virtual resource which can be merged with the first virtual resource, and acquire a merged resource of the first virtual resource and the second virtual resource to give to a streamer user. In this way, the merged resource is displayed on the live streaming interface, and the merged virtual resource for giving a gift is added in a live streaming scene, and virtual resources gave by different users can be merged to be a new virtual resource for giving a gift. As a result, the interactivity, richness and interest of users in giving a gift during the live streaming is enhanced and the interactive experience of live streaming is improved.

In some embodiments, after the live streaming interface displays the merged resource and the merged identifier, the method for live streaming interaction of embodiments of the present disclosure may further comprise: displaying a dialog control with the first user; displaying, in response to a triggering operation of the second user for a dialog control, a dialog interface with the first user; carrying on a dialog with the first user based on the dialog interface.

The dialogue control can be a functional control for realizing dialogue between different users, and a dialogue interface can be quickly entered by triggering the dialogue control. The dialogue interface can be an interface for realizing dialogues and communication between different users, and the dialogue interface may comprise a plurality of functional controls for realizing dialogues, and the dialogue method here may comprise text, voice, video, etc. without limitation.

After displaying the merged resource and the merged identifier on the live streaming interface, the second client may display a dialogue control capable of quickly initiating a dialogue with the first user. The dialogue control may comprise information about the first user, for example a head portrait and a user name of the first user, etc., and then if receiving a triggering operation of the second user for the dialog control, the second client may initiate a dialog request with the first user, and display a dialog interface with the first user after acquiring confirmation from the first user, and the second user can achieve a fast dialog with the first user based on the dialog interface.

In the above-mentioned solution, in a scene of giving a gift during the live streaming, if different users send a merged resource as a gift to a streamer user, these different users can quickly establish a connection at this moment, and perform a dialogue in a dialogue interface based on a dialogue control. As a result, the interactivity and sociality between different users giving gifts is enhanced, the richness and playability of the live streaming gift is increased, and the experience of giving a gift during the live streaming of the user is improved.

Figure 6:
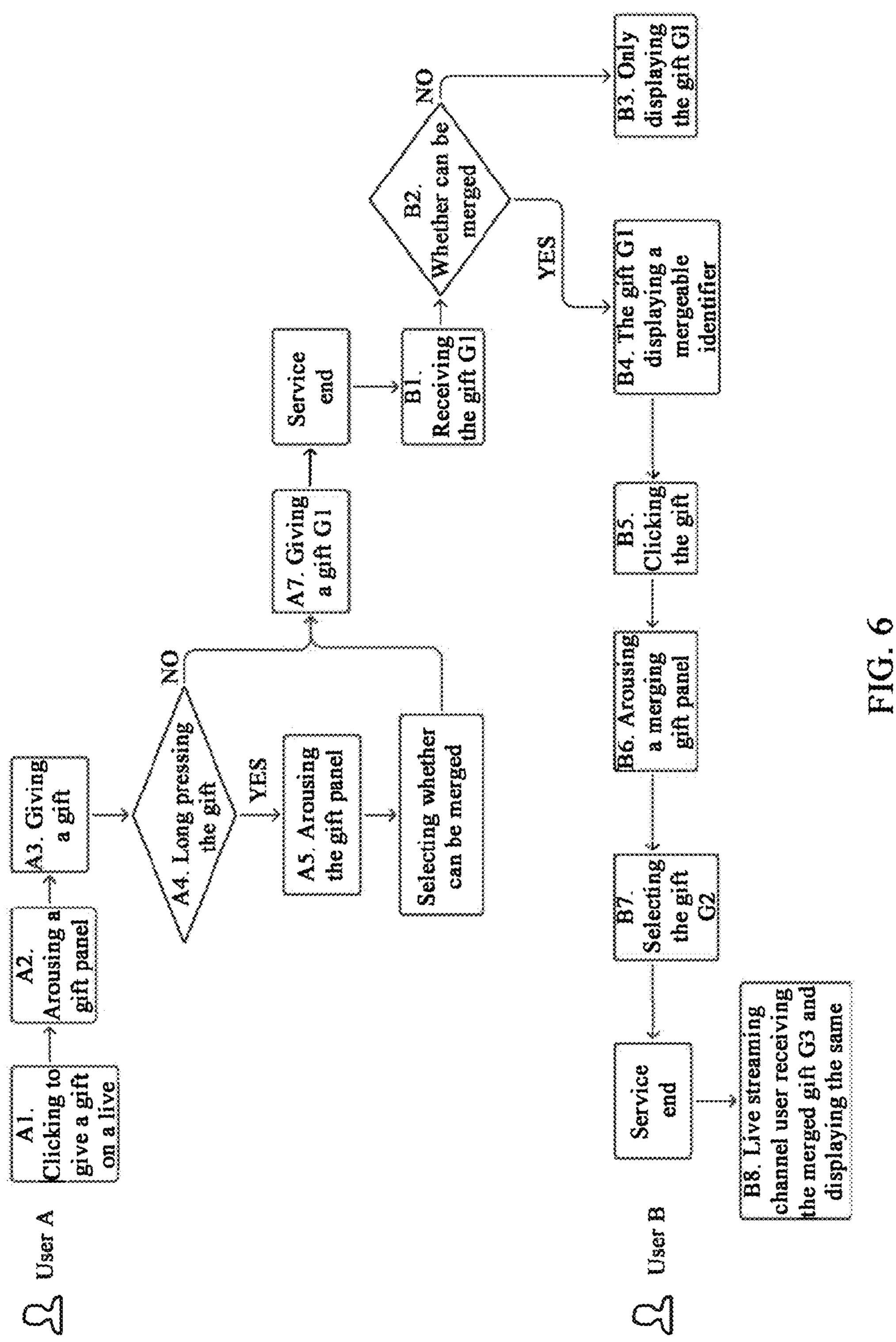
FIG. 6 illustrates a schematic flow diagram of another method for live streaming interaction in accordance with an embodiment of the present disclosure.

Next, the method for live streaming interaction of embodiments of the present disclosure is further described by way of a specific example. Illustratively, FIG. 6 is a flow diagram of another method for live streaming interaction provided by an embodiment of the present disclosure. As shown in FIG. 6, the figure takes two users watching the live streaming, including a user A and a user B, as an example, and a virtual resource is characterized by a gift, and the specific process may comprise an operation process of the user A and an operation process of the user B;

The operation process of the user A may comprise: A1) the user A clicks to give a gift on a live streaming channel, namely, clicking "give a gift" control; A2) arousing a gift panel; A3) the user A selects a gift G1 to be sent, for example, selecting a gift [A]; A4) long pressing the gift G1 which is the above-mentioned first virtual resource; A5) arousing the gift [A] gift panel which comprises a resource merging control; A6) the user A selects whether the present gift G1 is merged, and the resource merging control can be a radio button which is not selected by default, and is selected after being triggered by the user; A7) sending the gift G1, requesting a service-end gift system, and if the present gift-sending user A selects merging, the gift system saves a merging operation field (bool is_can_merge=true) of the gift G1, and sends same to the streamer user and clients where other users are located, including the client of the user B.

The operation process of the user B may comprise: B1) The user B watching the live streaming receives the gift G1 [A] sent by the user A; B2) determining whether the gift G1 is merged; B3) if the merging operation field bool is_can_merge of the gift G1 is false, then the merging cannot be made, and only the gift G1 is displayed; B4) if the merging operation field bool is_can_merge of the gift G1 is true, then the gift G1 can be merged, and a mergeable identifier is displayed in the upper right corner while the gift G1 is displayed; B5) The user B clicks the gift G1 displaying on the live streaming channel; B6) arousing a merging gift panel of the gift G1 which can display at least one gift that can be combined with the gift G1, namely, at least one resource to be merged corresponding to the above-mentioned first virtual resource; B7) the user B selects a gift G2 which can be merged with the gift G1, and gives a gift, and requests a giving gift operation to a giving gift system of a service end; B8) the user on the live streaming channel receives the merged gift G3 and displays same; the user B and other users on the live streaming channel receive the merged gift G3, display the merged gift G3 and the merged identifier, and prompt the user A and the user B to send the merged gift G3; and the merged gift G3 differs as the gift G2 selected by the user B differs, for example, the gift G2 is [B], the merged gift G3 is [C], the gift G2 is [D] and the merged gift G3 is [E].

In the above-mentioned solution, compared with displaying gifts sent by a single user upon sending gifts during the live streaming in the related art, the present application enables gifts sent by two or more users to be merged to acquire new gifts for giving a gift by means of merging gifts, increasing the playability of the live streaming gifts and the interactivity and sociability between users giving gifts, and improving the interactive experience of the giving gifts during the live streaming.

Figure 7:
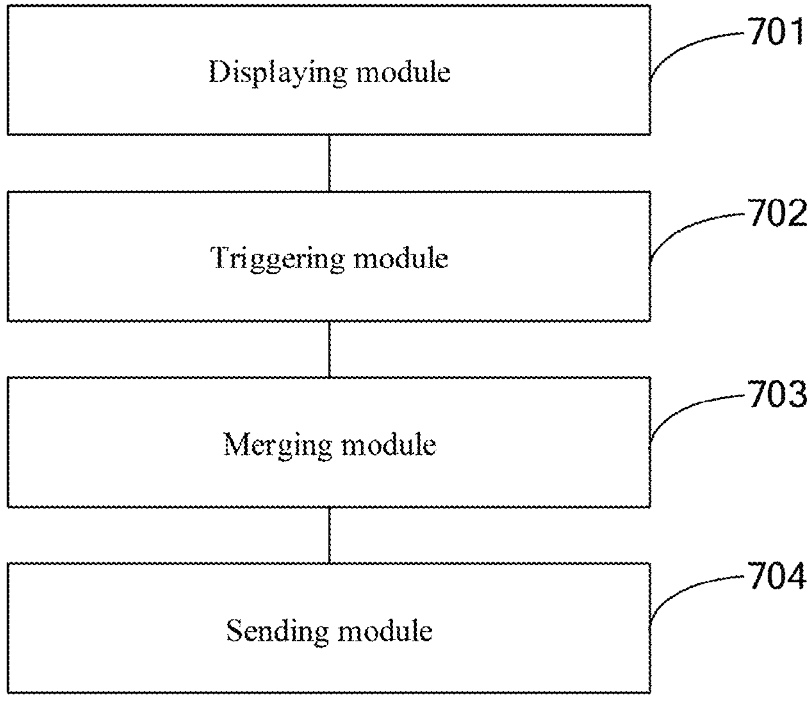
FIG. 7 illustrates a structural diagram of an apparatus for live streaming interaction in accordance with an embodiment of the present disclosure.

FIG. 7 illustrates a structural diagram of an apparatus for a live streaming interaction and the apparatus may be implemented in software and/or hardware and that may be generally integrated into an electronic device according to an embodiment of the present disclosure. As shown in FIG. 7, comprising:

a displaying module 701 for, displaying a first virtual resource comprising a merged identifier on a live streaming interface, the first virtual resource is sent to a primary user for a first user;

a triggering module 702 for, displaying, in response to a triggering operation of a second user for the first virtual resource, at least one resource to be merged corresponding to the first virtual resource;

a merging module 703 for, acquiring, in response to a selection operation of the second user for a second virtual resource of the at least one resource to be merged, a merged resource of the first virtual resource and the second virtual resource;

a sending module 704 for, sending the merged resource to the streamer user, and displaying the merged resource and a merged identifier on the live streaming interface.

Alternatively, the apparatus further comprises a determination module for:

acquiring the first virtual resource, and determining whether the first virtual resource supports merging.

The displaying module 701 is used for:

if it is determined that the first virtual resource supports merging, a first virtual resource comprising a mergable identifier is displayed on a live streaming interface.

Alternatively, the displaying module 701 is specifically used for:

if a merging operation field corresponding to the first virtual resource is a preset value, it is determined that the first virtual resource supports merging.

Alternatively, a merging operation field corresponding to the first virtual resource is set as the preset value after the first user performs a triggering operation on a resource merging control.

Alternatively, a merging module 703 is used for:

Superimposing the first virtual resource and the second virtual resource to acquire a corresponding merged resource;

or, extracting, based on matching the first virtual resource and the second virtual resource in a preset resource library, a target virtual resource successfully matched as the merged resource.

Alternatively, the apparatus further comprises a dialog module for: after the merged resource and a merged identifier being displayed on the live streaming interface, displaying a dialog control with the first user;

displaying, in response to a triggering operation of the second user for a dialog control, a dialog interface with the first user;

carrying on a dialog with the first user based on the dialog interface.

Alternatively, a number of the second virtual resources is one or more.

The apparatus for live streaming interaction provided by an embodiment of the present disclosure can execute the method for live streaming interaction provided by any embodiment of the present disclosure, and has corresponding functional modules and advantages for executing the method.

In the embodiments, a way for giving a gift for the merged virtual resource is added in a live streaming scene, and virtual resources given by different users can be merged into a new virtual resource for giving a gift, thus enhancing the interactivity, richness, and interest of users in giving a gift during the live streaming and improving an interactive experience of live streaming.

The subject matter provided by the embodiments of the present disclosure have the following advantages compared with the prior art: a live streaming interaction solution provided by embodiments of the present disclosure comprises: displaying a first virtual resource comprising a mergeable identifier on a live streaming interface, wherein the first virtual resource is sent from a first user to a streamer user; displaying, in response to a triggering operation of a second user for the first virtual resource, at least one resource to be merged corresponding to the first virtual resource; acquiring, in response to a selection operation of the second user for a second virtual resource of the at least one resource to be merged, a merged resource of the first virtual resource and the second virtual resource; sending the merged resource to the streamer user, and displaying the merged resource and a merged identifier on the live streaming interface. With the above-mentioned subject matter, with regard to a first virtual resource comprising a mergable identifier sent by one user displayed on a live streaming interface, another user can select a second virtual resource which can be merged with the first virtual resource, and acquire a merged resource of the first virtual resource and the second virtual resource to give to a streamer user. In this way, the merged resource is displayed on the live streaming interface, and the merged virtual resource for giving a gift is added in a live streaming scene, and virtual resources gave by different users can be merged to be a new virtual resource for giving a gift. As a result, the interactivity, richness and interest of users in giving a gift during the live streaming is enhanced and the interactive experience of live streaming is improved.

Embodiments of the present disclosure also provide a computer program product comprising computer programs/instructions which when executed by a processor implement the method for live streaming interaction provided by any of the embodiments of the present disclosure.

Figure 8:
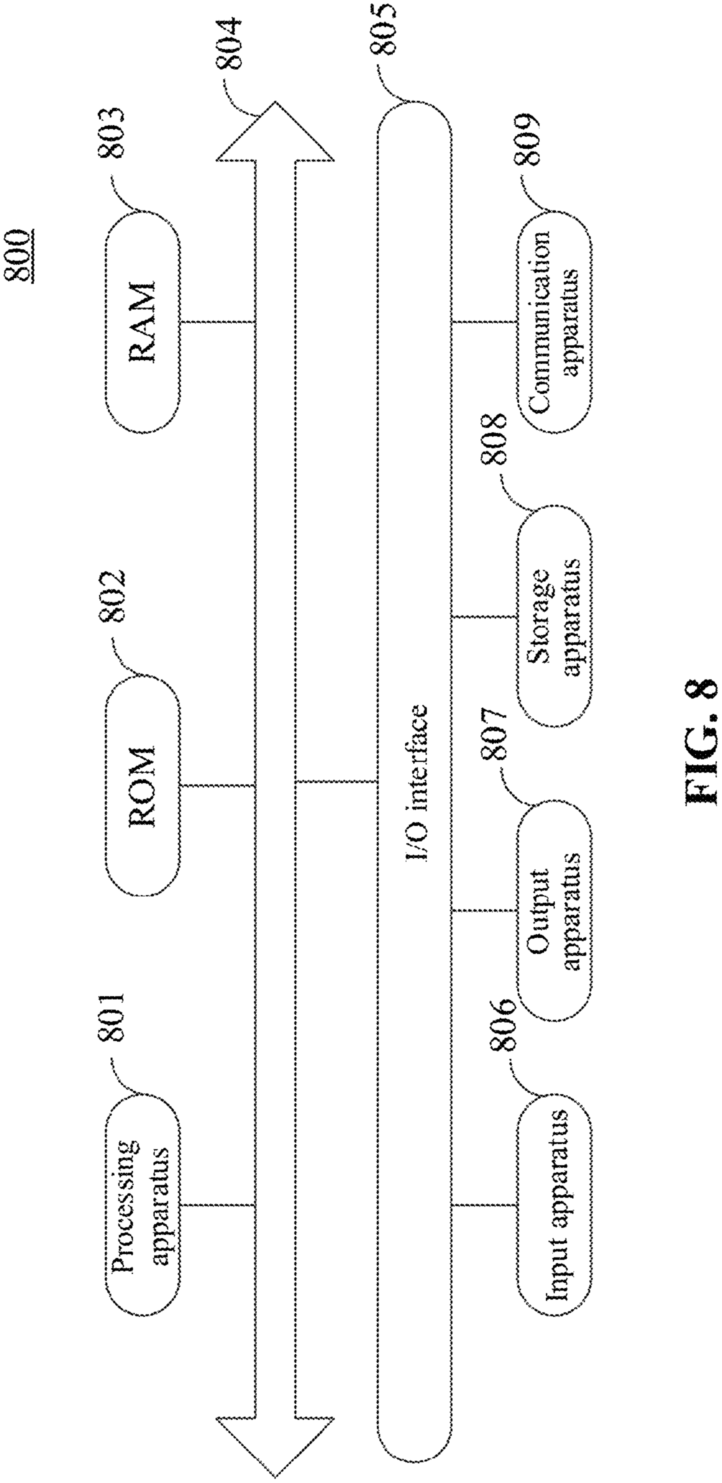
FIG. 8 illustrates a structural diagram of an electronic device in accordance with an embodiment of the present disclosure.

FIG. 8 illustrates a structural diagram of an electronic device in accordance with an embodiment of the present disclosure.

With specific reference now to FIG. 8, a block diagram of an electronic device 800 suitable for implementing embodiments of the present disclosure is shown. The electronic device 800 in the embodiment of the present disclosure may include, but is not limited to, a mobile terminal such as a mobile phone, a notebook computer, a digital broadcast receiver, a PDA (personal digital assistant), a PAD (tablet computer), a PMP (portable multimedia player), an in-vehicle terminal (e.g., an in-vehicle navigation terminal), etc. and a fixed terminal such as a digital TV, a desktop computer, etc. The electronic device shown in FIG. 8 is merely an example and should not impose any limitations on the functionality and scope of use of embodiments of the present disclosure.

As shown in FIG. 8, the electronic device 800 may include a processing apparatus (e.g., central processing unit, graphics processor, etc.) 801 that may perform various suitable actions and processes in accordance with programs stored in a read only memory (ROM) 802 or loaded from a memory 808 into a random access memory (RAM) 803. In the RAM 803, various programs and data required for the operation of the electronic device 800 are also stored. The processing apparatus 801, the ROM 802 and the RAM 803 are connected to each other via a bus 804. An input/output (I/O) interface 805 is also coupled to bus 804.

In general, the following devices may be connected to the I/O interface 805: an input device 806 including, for example, a touch screen, a touch pad, a keyboard, a mouse, a camera, a microphone, an accelerometer, a gyroscope, etc.; an output device 807 including, for example, a liquid crystal display (LCD), a speaker, a vibrator, and the like; the memory 808 including, for example, a magnetic tape, a hard disk, etc.; and communication means 809. The communication means 809 may allow the electronic device 800 to communicate wirelessly or wired with other devices to exchange data. While FIG. 8 illustrates an electronic device 800 having various means, it is to be understood that not all illustrated means are required to be implemented or provided. More or fewer devices may alternatively be implemented or provided.

In particular, the processes described above with reference to flow diagrams may be implemented as computer software programs in accordance with embodiments of the present disclosure. For example, embodiments of the present disclosure include a computer program product comprising a computer program embodied on a non-transitory computer-readable medium, the computer program comprising program code for performing the method illustrated by the flowchart. In such embodiments, the computer program may be downloaded and installed from a network via communication means 809, or from the memory 808, or from the ROM 802. When the computer program is executed by the processing apparatus 801, the above-described functions defined in the live interaction method of the embodiment of the present disclosure are performed.

Note that the computer-readable medium described above in this disclosure can be either a computer-readable signal medium or a computer-readable storage medium, or any combination of the two. The computer-readable storage medium can be, for example but not limited to, an electronic, magnetic, optical, electromagnetic, infrared, or semiconductor system, apparatus, or device, or a combination of any of the above. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In this disclosure, a computer-readable storage medium can be any tangible medium that contains or stores a program that can be used by or in connection with an instruction execution system, apparatus, or device. In this disclosure, a computer-readable signal medium may comprise a data signal embodied in baseband or propagated as part of a carrier wave carrying computer-readable program code. Such propagated data signals may take many forms, including but not limited to, electromagnetic signals, optical signals, or any suitable combination of the preceding. The computer-readable signal medium can also be any computer-readable medium other than a computer-readable storage medium that can send, propagate, or transport the program for use by or in connection with the instruction execution system, apparatus, or device. The program code embodied on the computer-readable medium may be transmitted over any suitable medium including, but not limited to: wire, fiber optic cable, RF (radio frequency), and the like, or any suitable combination of the foregoing.

In some embodiments, clients, servers may communicate using any currently known or future developed network protocol, such as HTTP (Hyper Text Transfer Protocol), and may be interconnected with any form or medium of digital data communication (e.g., a communication network). Examples of communication networks include local area networks ("LANs"), wide area networks ("WANs"), internetworks (e.g., the Internet), and peer-to-peer networks (e.g., ad hoc peer-to-peer networks), as well as any currently known or future developed networks.

The computer readable medium may be contained in the electronic device; it may also be present separately and not fitted into the electronic device.

The computer-readable medium carries one or more programs that, when executed by the electronic device, cause the electronic device to: presenting a first virtual resource comprising a unified identifier on a live broadcast interface, wherein said first virtual resource is sent to a main broadcast user for a first user; in response to a triggering operation of the first virtual resource by a second user, presenting at least one resource to be merged corresponding to the first virtual resource; acquiring a syndicated resource of the first virtual resource and the second virtual resource in response to the second user selecting a second virtual resource in the at least one syndicated resource; sending the syndicated resource to the host user, and presenting the syndicated resource and a syndicated identifier on the live broadcast interface.

Computer program code for carrying out operations of the present disclosure may be written in one or more programming languages, including, but not limited to, object oriented programming languages, such as Java, smalltalk, C++, and conventional procedural programming languages, such as the "C" language or similar programming languages, or a combination thereof. The program code may execute entirely on the user's computer, partly on the user's computer, as a stand-alone software package, partly on the user's computer partly on a remote computer or entirely on the remote computer or server. In the case of a remote computer, the remote computer may be connected to the user's computer through any kind of network, including a local area network (LAN) or a wide area network (WAN), or it may be connected to an external computer (e.g., through the Internet using an Internet Service Provider).

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems which perform the specified functions or operations, or combinations of special purpose hardware and computer instructions.

The elements described in connection with the embodiments disclosed herein may be implemented in software or hardware. The name of an element does not in any way limit the element itself.

The functions described herein above may be performed, at least in part, by one or more hardware logic components. For example, without limitation, exemplary types of hardware logic components that may be used include: field Programmable Gate Arrays (FPGAs), application Specific Integrated Circuits (ASICs), application Specific Standard Products (ASSPs), systems on a Chip (SOCs), complex Programmable Logic Devices (CPLDs), and the like.

In the context of this disclosure, a machine-readable medium can be a tangible medium that can contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the preceding. More specific examples of a machine-readable storage medium would include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the preceding.

It should be understood that prior to using the technical solutions disclosed in the embodiments of the present disclosure, the user should be informed of the type, scope of use, use scenario, etc. of the information involved in the present disclosure and be authorized by the user in an appropriate manner according to relevant laws and regulations.

The foregoing description is only a preferred embodiment of the disclosure and is illustrative of the principles of the technology employed. It will be appreciated by those skilled in the art that the scope of the present disclosure is not limited to any particular combination of the features described above, but is intended to encompass any combination of the features described above or their equivalents without departing from the spirit of the disclosure. For example, the above-mentioned features and the technical features disclosed in the present disclosure (but not limited to) having similar functions are interchanged to form a technical solution.

Further, while operations are depicted in a particular order, this should not be understood as requiring that the operations be performed in the particular order shown or in sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

We claim:

1. A method for live streaming interaction, comprising:

displaying a first virtual resource comprising a mergeable identifier on a live streaming interface, wherein the first virtual resource is sent from a first user to a streamer user;

displaying, in response to a triggering operation of a second user for the first virtual resource, at least one resource to be merged corresponding to the first virtual resource;

acquiring, in response to a selection operation of the second user for a second virtual resource of the at least one resource to be merged, a merged resource of the first virtual resource and the second virtual resource; and sending the merged resource to the streamer user, and displaying the merged resource and a merged identifier on the live streaming interface, wherein acquiring the merged resource of the first virtual resource and the second virtual resource comprises:

superimposing the first virtual resource and the second virtual resource to acquire a corresponding merged resource;

or, extracting, based on matching the first virtual resource and the second virtual resource in a preset resource library, a target virtual resource successfully matched as the merged resource.

2. The method of claim 1, further comprising:

acquiring the first virtual resource, and determining whether the first virtual resource supports merging; and wherein displaying the first virtual resource comprising a mergeable identifier on a live streaming interface comprises:

in response to determining that the first virtual resource supports merging, displaying the first virtual resource comprising the mergeable identifier on a live streaming interface.

3. The method of claim 2, wherein determining that the first virtual resource supporting merging comprises:

in response to a merging operation field corresponding to the first virtual resource being a preset value, determining that the first virtual resource supports merging.

4. The method according to claim 3, wherein the merging operation field corresponding to the first virtual resource is set to the preset value after the first user performs a trigger operation for a resource merging control.

5. The method of claim 1, wherein after displaying the merged resource and the merged identifier on the live streaming interface, the method further comprises:

displaying a dialog control with the first user;

displaying, in response to a triggering operation of the second user for a dialog control, a dialog interface with the first user; and carrying on a dialog with the first user based on the dialog interface.

6. The method of claim 1, wherein a number of the second virtual resources is one or more.

7. An electronic device comprising:

a processor; and a memory for storing processor executable instructions, wherein the processor is configured to read the executable instructions from the memory and execute the instructions to implement a method for live streaming interaction comprising:

displaying a first virtual resource comprising a mergeable identifier on a live streaming interface, wherein the first virtual resource is sent from a first user to a streamer user;

displaying, in response to a triggering operation of a second user for the first virtual resource, at least one resource to be merged corresponding to the first virtual resource;

acquiring, in response to a selection operation of the second user for a second virtual resource of the at least one resource to be merged, a merged resource of the first virtual resource and the second virtual resource; and sending the merged resource to the streamer user, and displaying the merged resource and a merged identifier on the live streaming interface, and wherein acquiring the merged resource of the first virtual resource and the second virtual resource comprises:

superimposing the first virtual resource and the second virtual resource to acquire a corresponding merged resource;

or, extracting, based on matching the first virtual resource and the second virtual resource in a preset resource library, a target virtual resource successfully matched as the merged resource.

8. The electronic device of claim 7, wherein the method further comprises:

acquiring the first virtual resource, and determining whether the first virtual resource supports merging; and wherein displaying the first virtual resource comprising a mergeable identifier on a live streaming interface comprises:

in response to determining that the first virtual resource supports merging, displaying the first virtual resource comprising the mergeable identifier on a live streaming interface.

9. The electronic device of claim 8, wherein determining that the first virtual resource supporting merging comprises:

in response to a merging operation field corresponding to the first virtual resource being a preset value, determining that the first virtual resource supports merging.

10. The electronic device according to claim 9, wherein the merging operation field corresponding to the first virtual resource is set to the preset value after the first user performs a trigger operation for a resource merging control.

11. The electronic device of claim 7, wherein after displaying the merged resource and the merged identifier on the live streaming interface, the method further comprises:

displaying a dialog control with the first user;

displaying, in response to a triggering operation of the second user for a dialog control, a dialog interface with the first user; and carrying on a dialog with the first user based on the dialog interface.

12. The electronic device of claim 7, wherein a number of the second virtual resources is one or more.

13. A non-transitory computer-readable storage medium storing a computer program thereon for executing a method for live streaming interaction comprising:

displaying a first virtual resource comprising a mergeable identifier on a live streaming interface, wherein the first virtual resource is sent from a first user to a streamer user;

displaying, in response to a triggering operation of a second user for the first virtual resource, at least one resource to be merged corresponding to the first virtual resource;

acquiring, in response to a selection operation of the second user for a second virtual resource of the at least one resource to be merged, a merged resource of the first virtual resource and the second virtual resource; and sending the merged resource to the streamer user, and displaying the merged resource and a merged identifier on the live streaming interface, and wherein acquiring the merged resource of the first virtual resource and the second virtual resource comprises:

superimposing the first virtual resource and the second virtual resource to acquire a corresponding merged resource;

or, extracting, based on matching the first virtual resource and the second virtual resource in a preset resource library, a target virtual resource successfully matched as the merged resource.

14. The non-transitory computer-readable storage medium of claim 13, wherein the method further comprises:

acquiring the first virtual resource, and determining whether the first virtual resource supports merging; and wherein displaying the first virtual resource comprising a mergeable identifier on a live streaming interface comprises:

in response to determining that the first virtual resource supports merging, displaying the first virtual resource comprising the mergeable identifier on a live streaming interface.

15. The non-transitory computer-readable storage medium of claim 14, wherein determining that the first virtual resource supporting merging comprises:

in response to a merging operation field corresponding to the first virtual resource being a preset value, determining that the first virtual resource supports merging.

16. The non-transitory computer-readable storage medium according to claim 15, wherein the merging operation field corresponding to the first virtual resource is set to the preset value after the first user performs a trigger operation for a resource merging control.

17. The non-transitory computer-readable storage medium of claim 13, wherein after displaying the merged resource and the merged identifier on the live streaming interface, the method further comprises:

displaying a dialog control with the first user;

displaying, in response to a triggering operation of the second user for a dialog control, a dialog interface with the first user; and carrying on a dialog with the first user based on the dialog interface.

* * * * *